United States Patent
Iwagaki et al.

(10) Patent No.: US 11,454,297 B2
(45) Date of Patent: Sep. 27, 2022

(54) TORSIONAL VIBRATION DAMPER

(71) Applicants: TOYOTA JIDOSHA KABUSHIKI KAISHA, Toyota (JP); AISIN AW CO., LTD., Anjo (JP); AISIN FUKUI CORPORATION, Echizen (JP)

(72) Inventors: Tomo Iwagaki, Mishima (JP); Hideyuki Nishida, Sunto-gun (JP); Masayuki Ishibashi, Numazu (JP); Yoichi Oi, Anjo (JP); Yu Mizukami, Anjo (JP); Takuya Yoshikawa, Fukui (JP); Katsunori Tanaka, Fukui (JP); Tomoyuki Hiramoto, Sabae (JP)

(73) Assignees: TOYOTA JIDOSHA KABUSHIKI KAISHA, Toyota (JP); AISIN AW CO., LTD., Anjo (JP); AISIN FUKUI CORPORATION, Echizen (JP)

( * ) Notice: Subject to any disclaimer, the term of this patent is extended or adjusted under 35 U.S.C. 154(b) by 310 days.

(21) Appl. No.: 16/788,347

(22) Filed: Feb. 12, 2020

(65) Prior Publication Data
US 2020/0263762 A1    Aug. 20, 2020

(30) Foreign Application Priority Data
Feb. 14, 2019  (JP) .............................. JP2019-024558

(51) Int. Cl.
*F16H 45/02*      (2006.01)
*F16F 15/134*    (2006.01)
*F16D 3/12*       (2006.01)
*F16F 15/14*      (2006.01)

(52) U.S. Cl.
CPC .......... *F16F 15/13469* (2013.01); *F16D 3/12* (2013.01); *F16F 15/1478* (2013.01); *F16H 45/02* (2013.01); *F16H 2045/0231* (2013.01); *F16H 2045/0268* (2013.01)

(58) Field of Classification Search
CPC . F16F 15/13469; F16F 15/1478; F16H 45/02; F16H 2045/0231; F16H 45/0268
See application file for complete search history.

(56) References Cited

U.S. PATENT DOCUMENTS

| | | | |
|---|---|---|---|
| 8,961,346 B2 * | 2/2015 | Murakami | F16H 45/02 475/71 |
| 9,500,259 B1 * | 11/2016 | Bai | F16F 15/1206 |
| 10,323,715 B2 * | 6/2019 | Nakamura | F16H 1/2863 |
| 10,400,874 B2 * | 9/2019 | Takahashi | F16F 15/1206 |
| 2018/0149232 A1 | 5/2018 | Yoshikawa et al. | |

FOREIGN PATENT DOCUMENTS

WO    WO 2016/208765 A1    12/2016

* cited by examiner

*Primary Examiner* — Huan Le
(74) *Attorney, Agent, or Firm* — Oblon, McClelland, Maier & Neustadt, L.L.P.

(57) ABSTRACT

A torsional vibration damper that damps torsional vibration effectively in a low-speed range. In the torsional vibration damper, a spring holder is formed by apertures of an input element and an output element, and an elastic member is held in the spring holder. A first moveable range of a planetary element extending from an initial position in a drive direction is wider than a second movable range of the planetary element extending from the initial position in a counter direction.

3 Claims, 6 Drawing Sheets

TORSIONAL VIBRATION DAMPER

CROSS REFERENCE TO RELATED APPLICATION

The present disclosure claims the benefit of Japanese Patent Application No. 2019-024558 filed on Feb. 14, 2019 with the Japanese Patent Office, the disclosure of which is incorporated herein by reference in its entirety.

BACKGROUND

Field of the Disclosure

Embodiments of the present disclosure relate to the art of a torsional vibration damper that suppresses torsional vibrations resulting from torque pulse.

Discussion of the Related Art

WO 2016/208765 A1 describes an example of a damper device having a planetary gear unit for suppressing torsional vibrations resulting from torque pulse. In the damper device taught by WO 2016/208765 A1, the planetary gear unit is arranged in a torque converter having a lock-up clutch around a spring damper. In the planetary gear unit, a carrier is connected to the lockup clutch and a drive member of the spring damper so that a torque of an engine is applied to the carrier through the lock-up clutch, and a sun gear is connected to driven member of the spring. An intermediate member is disposed between the drive member and the driven member. Specifically, the intermediate member is connected to the drive member through a first elastic body, and is connected to the driven member through a second elastic member. A plurality of pinion gears is attached to the carrier in such a manner that a clearance between the intermediate member and one of the pinion gears in a direction that the intermediated member is oscillated by an engine torque is increased wider than a clearance between the intermediate member and the pinion gear of the opposite side. The carrier and the sun gear are oscillated relatively to each other within a predetermined degree by pulsation of the engine torque while compressing the first elastic body and the second elastic body. As a result, the ring gear is oscillated compulsory by the first elastic body and the second elastic body thus compressed and expanded repeatedly with different phase from the pulsations of the engine torque. An inertia torque of the ring gear thus oscillated acts as a vibration suppressing torque to damp pulsation of output torque from the planetary gear unit.

Thus, in the damper device described in WO 2016/208765 A1, the first elastic body and the second elastic body are connected in series to allow the spring damper to be oscillated widely by the engine torque. According to the teachings of WO 2016/208765 A1, therefore, an antiresonance point may be lowered by reducing a synthesized spring constant of the spring damper to enhance vibration damping performance of the damper device within a low speed range of the engine. However, according to the teachings of WO 2016/208765 A1, the first elastic body and the second elastic body as well as the intermediate member are interposed between the drive member and the driven member of the spring damper. Thus, large number of parts are required to form the damper device described in WO 2016/208765 A1, and hence a manufacturing cost of the damper device described in WO 2016/208765 A1 may be rather high.

SUMMARY

The present disclosure has been conceived noting the above-described technical problems, and it is therefore an object of the present disclosure to enhance a vibration damping performance of a torsional vibration damper by increasing an oscillation range of a planetary element in a direction that the planetary element is moved by an engine torque.

Embodiments of the present disclosure relates to a torsional vibration damper comprising a planetary unit. The planetary unit includes: a first rotary element; a second rotary element arranged concentrically around the first rotary element; a plurality of planetary elements interposed between the first rotary element and the second rotary element while engaging with at least one of the first rotary element and the second rotary element; and a third rotary element supporting the planetary elements in a rotatable manner. In the planetary unit, one of the rotary elements serves as an input element to which a torque of an engine is applied, another one of the rotary elements serves as an output element that outputs the torque, and still another one of the rotary elements serves as an inertia element that rotates relatively to the input element and the output element. The torsional vibration damper further comprises: an elastic member that is interposed between the input element and the output element to be deformed elastically by a torsional torque of the engine causing a relative rotation between the input element and the output element; and a spring holder that is formed by an aperture of the input element and an aperture of the output element to hold the elastic member therein. In the torsional vibration damper, the inertia element is rotated by the torque of the engine and oscillated by a pulsation of the torque of the engine. Each of the planetary element is individually situated at an initial position when the relative rotation between the input element and the output element is not caused and the elastic member is not compressed. In order to achieve the above-explained objective, according to the exemplary embodiment of the present disclosure, an oscillation range of the planetary element is defined into a first moveable range extending from the initial position in a drive direction in which the planetary element is moved by the torsional torque of the engine, and a second movable range extending from the initial position in a counter direction opposite to the drive direction. In addition, the first movable range is set wider than the second movable range.

In a non-limiting embodiment, the first rotary element may include a sun gear, the second rotary element may include a ring gear, the planetary element may include a pinion gear, and the third rotary element may include a carrier. In the planetary unit, one of the sun gear and the carrier may serve as the input element, other one of the sun gear and the carrier may serve as the output element, and the ring gear may serve as the inertia element. In addition, external teeth may be formed on an outer circumference of the sun gear in such a manner that the first movable range extends longer than the second movable range, and the initial position is situated radially outer side of an intermediate portion of the spring holder in a circumferential direction.

In a non-limiting embodiment, the pinion gear may be attached to the carrier in such a manner that the first movable range extends longer than the second movable range.

According to the embodiment of the present disclosure, torque of the engine is applied to the input element of the torsional vibration damper. The elastic member is interposed between the input element and the output element while being held in the spring holder formed by the apertures of the input element and the output element. When the relative rotation between the input element and the output element is not caused and the elastic member is not compressed, each of the planetary element is individually situated at an initial position. As described, the first movable range extending from the initial position in the drive direction is wider than the second movable range extending from the initial position in the counter direction. According to the embodiment of the present disclosure, therefore, a degree of relative rotation between the input element and the output element may be increased and a stroke of the elastic member can be increased. For these reasons, the planetary elements are allowed to further rotate in the drive direction compared to the conventional art. By thus increasing the movable range of the planetary elements in the drive direction, a spring constant of the elastic member can be reduced to be further compressed compared to the conventional art. Consequently, a resonance point of the torsional vibration damper can be shifted to the low speed side. According to the embodiment of the present disclosure, therefore, torsional vibrations resulting from pulsation of an input torque to the torsional vibration damper can be damped effectively in a low speed range of the engine without increasing a size of the torsional vibration damper.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

First Example

Figure 1:
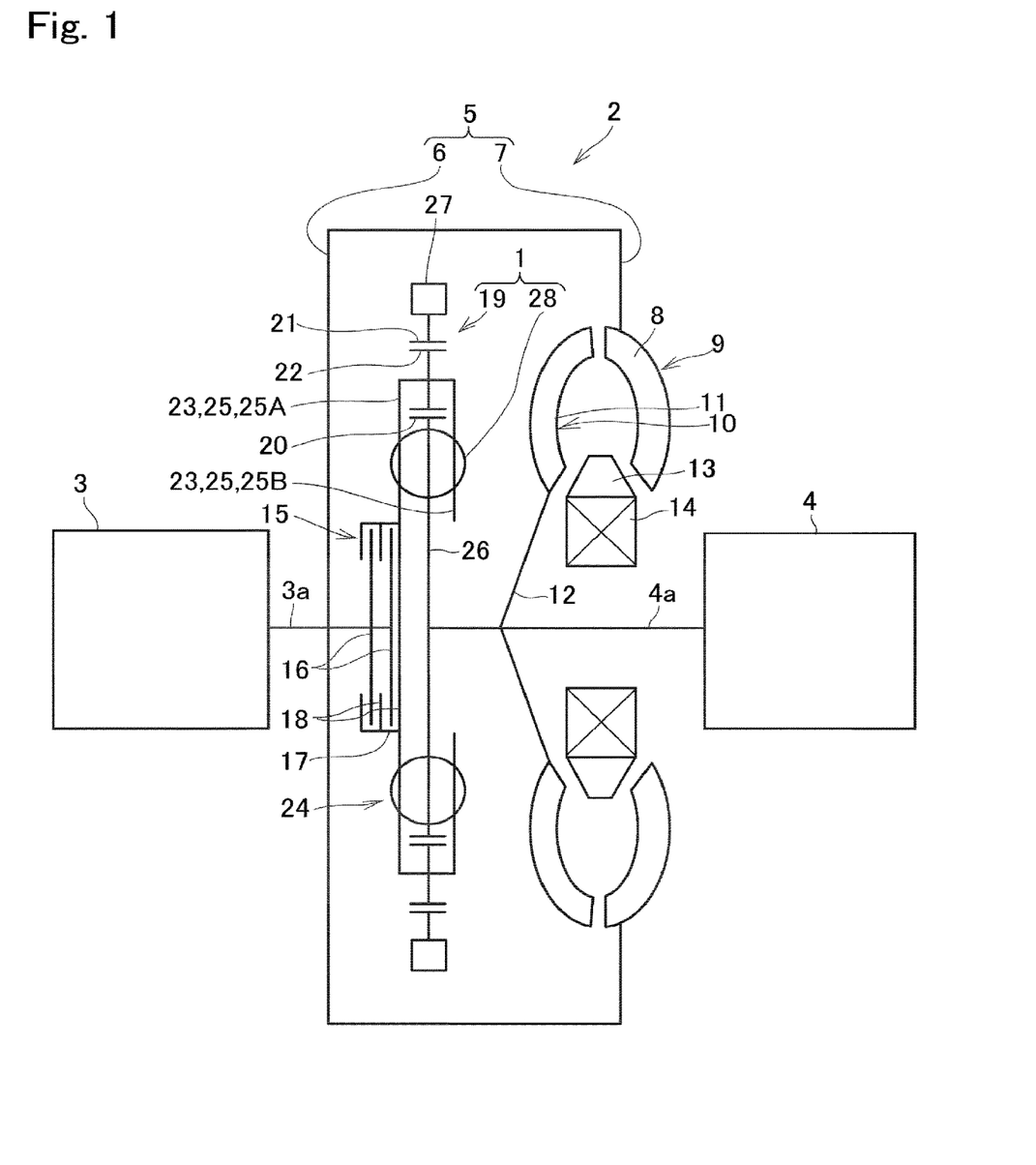
FIG. 1 is a schematic illustration showing a structure of a torsional vibration damper according to the exemplary embodiment of the present disclosure.

Examples of the present disclosure will now be explained with reference to the accompanying drawings. Turning now to FIG. 1, there is shown the first example of the torsional vibration damper 1 arranged in a torque converter 2. As illustrated in FIG. 1, in the torque converter 2, the torsional vibration damper 1 is disposed on a torque transmission path between a prime mover 3 and a drive object 4. For example, an internal combustion engine such as a gasoline engine and a diesel engine may be adopted as the prime mover (as will be called the "engine" hereinafter) 3, and an output torque of the engine 3 pulsates inevitably. A torque of the engine 3 is increased with an increase in a speed of the engine 3, but reduced after the speed of the engine 3 is increased higher than a speed at which the torque of the engine 3 is increased to a maximum torque. The pulsation of the torque of the engine 3 is reduced with an increase in the speed of the engine 3. For example, the drive object (as will be called the "transmission" hereinafter) 4 is a conventional transmission such as a geared transmission in which a speed ratio changes stepwise, and a continuously variable transmission in which a speed ratio changes continuously.

An internal space of the torque converter 2 is maintained in a liquid-tight condition by a housing 5 including a front cover 5 connected to an output shaft 3a of the engine 3, and a pump shell 6 joined to the front cover 6.

In order to transmit torque, fluid (e.g., oil) is held in the housing 5 of the torque converter 2. A plurality of pump blades 8 are attached to an inner surface of the pump shell 7 to form a pump impeller 9. A turbine runner 10 that is substantially symmetrical with the pump impeller 9 is opposed to the pump impeller 9 to be rotated by a spiral flow of the oil created by the pump impeller 9. Specifically, the turbine runner 10 comprises a turbine shell (not shown), and a plurality of turbine blades 11 attached to an inner surface of the turbine shell. The turbine runner 10 is connected to an input shaft 4a of the transmission 4 through a turbine hub 12.

A stator 13 is interposed between the pump impeller 9 and the turbine runner 10 while being attached to a predetermined fixed shaft (not shown) through a one-way clutch 14. When a speed difference between the pump impeller 9 and the turbine runner 10 is small, the oil flowing out of the turbine runner 10 is delivered to the pump impeller 9 while changing a flowing direction. By contrast, when the speed difference between the pump impeller 9 and the turbine runner 10 is large, the oil flowing out of the turbine runner 10 is delivered to the pump impeller 9 without changing the flowing direction to rotate the pump impeller 9. To this end, when a speed difference between the pump impeller 9 and the turbine runner 10 is small, a rotation of the stator 13 is stopped by engaging the one-way clutch 14. By contrast, when a speed difference between the pump impeller 9 and the turbine runner 10 is large, the stator 13 is allowed to rotate by disengaging the one-way clutch 14.

A lockup clutch 15 is opposed to an inner surface of the front cover 6. The lockup clutch 15 is a multiple-plate clutch comprising: a plurality of clutch discs 16 splined to a clutch hub (not shown) joined to the front cover 6; and a plurality of clutch plates 18 splined to an inner surface of a clutch drum 17 covering an outer circumference of the clutch hub. Specifically, the clutch discs 16 and the clutch plates 18 are arranged alternately between a lockup piston (not shown) and a snap ring (not shown) attached to the clutch drum 17. The clutch discs 16 and the clutch plates 18 are clamped to be frictionally contacted to one another between the lockup piston and the snap ring by advancing the lockup piston. As a result, the lockup clutch 15 is brought into engagement to transmit torque between the clutch discs 16 and the clutch plates 18. Although not especially shown in FIG. 1, a return spring is arranged radially inner side of the lockup clutch 15 while being overlapped with the lockup clutch 15 at least partially. The return springs pushes the lockup piston in a direction to isolate the clutch discs 16 and the clutch plates 18 from each other, that is, in a direction to disengage the lockup clutch 15.

The torsional vibration damper 1 is arranged adjacent to the lockup clutch 15 in an axial direction of the torque converter 2. The torsional vibration damper 1 comprises a planetary unit and a plurality of elastic members. The planetary unit is adopted to perform a differential action among three rotary elements, and according to the exemplary embodiment of the present disclosure, a single-pinion planetary gear unit 19 is employed as the planetary unit. The planetary gear unit 19 comprises: a sun gear 20; a ring gear 21 arranged concentrically around the sun gear 20; and a carrier 23 that supports a plurality of pinion gears 22 interposed between the sun gear 20 and the ring gear 21 in a rotatable manner. In the examples of the present disclosure, the sun gear 20 and the ring gear 21 serve as a first rotary element and a second rotary element, each of the pinion gears 22 serves as a planetary element, and the carrier 23 serves as a third rotary element.

The clutch drum 17 of the lockup clutch 15 is connected to the carrier 23 to serve as an input element. The carrier 23 also serve as a drive plate 25 of a spring damper 24, and the sun gear 20 is formed on an outer circumference of a driven plate 26 of the spring damper 24 to serve as an output element. An inertia body 27 is arranged around the ring gear 21. The inertia body 27 may be formed not only integrally with the ring gear 21 but also formed separately from the ring gear 21. Given that the inertia body 27 is formed separately from the ring gear 21, the inertia body 27 is attached to an outer circumferential portion of the ring gear 21 to be rotated integrally therewith. Accordingly, the ring gear 21 and the inertia body 27 serve as an inertia element of the examples of the present disclosure.

The spring damper 24 is arranged concentrically inside of the planetary gear unit 19 while being overlapped with the planetary gear unit 19 at least partially in the radial direction. The drive plate 25 is arranged upstream of the spring damper 24 in a torque transmitting direction, and according to the examples of the present disclosure, the drive plate 25 comprises an annular first drive plate 25A, and an annular second drive plate 25B. Specifically, the first drive plate 25A is disposed closer to the lockup clutch 15 than the second drive plate 25B in the axial direction.

The first drive plate 25A and the second drive plate 25B are joined to each other through after-mentioned connection means 35 such as rivets or bolts to be rotated integrally while keeping a predetermined clearance therebetween in the axial direction. Specifically, the first drive plate 25A and the second drive plate 25B are joined to each other by a plurality of the connection means 35 on both sides of each of the pinion gears 22 of the planetary gear unit 19 in the circumferential direction at a radially same level as the pinion gears 22. That is, each of the pinion gears 22 is situated between the connection means 35 while keeping predetermined clearances in the circumferential direction to the connection means 35 on both sides. Thus, the first drive plate 25A and the second drive plate 25B serve as the carrier 23 of the planetary gear unit 19.

Figure 2:
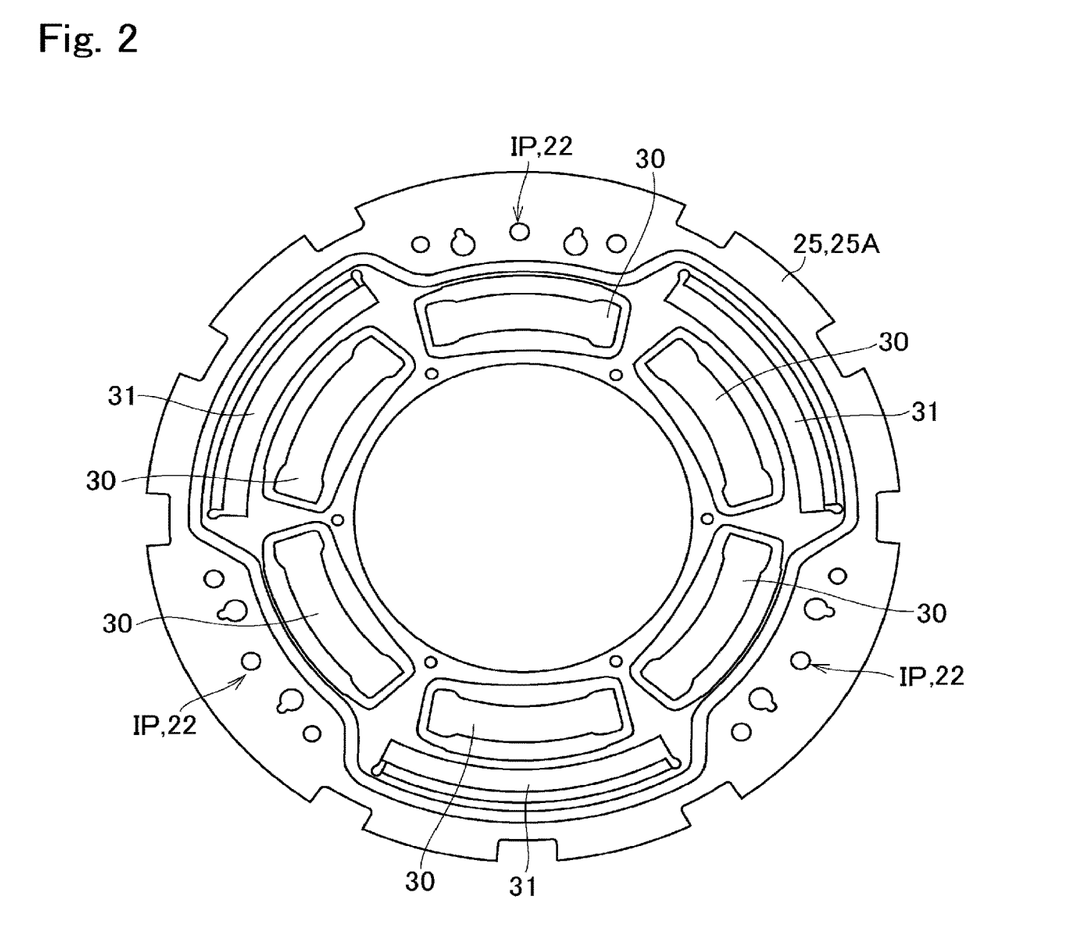
FIG. 2 is a front view showing a structure of a drive plate according to a first example of the present disclosure.
Figure 3:
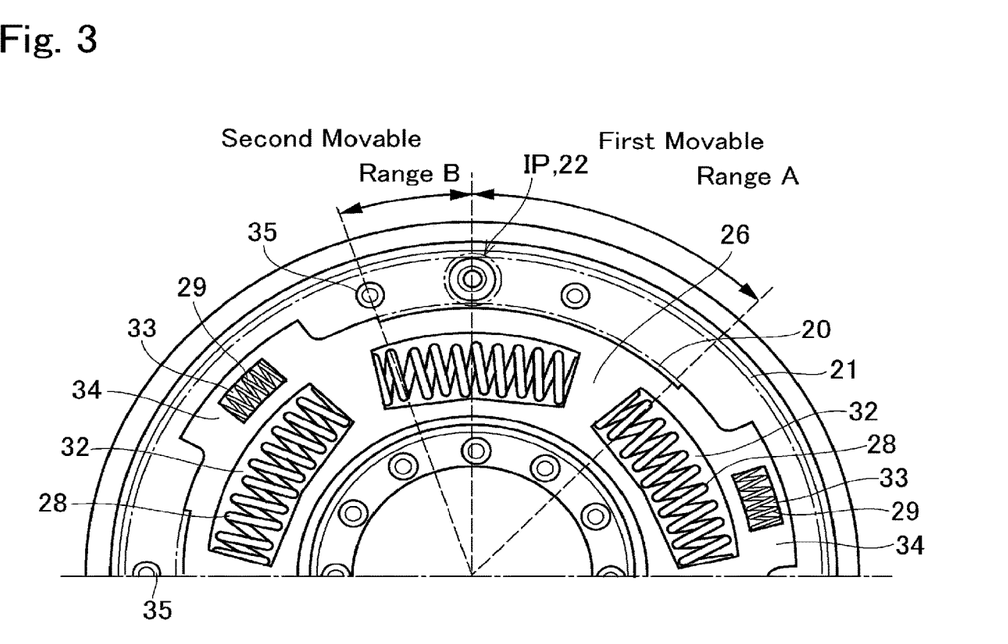
FIG. 3 is a partial front view showing a structure of the torsional vibration damper according to the first example of the present disclosure.

As illustrated in FIGS. 1 and 3, a driven plate 26 is interposed between the first drive plate 25A and the second drive plate 25B. Specifically, the driven plate 26 is connected to the first drive plate 25A and the second drive plate 25B through a plurality of first springs 28 and a plurality of second springs 29 so that the drive plate 25 and the driven plate 26 rotate relatively to each other within a predetermined degree. Accordingly, the first spring 28 and the second spring 29 serve as an elastic member of the examples of the present disclosure. A spring coefficient of each of the second springs 29 is individually larger than a spring coefficient of each of the first springs 28. Therefore, between the first drive plate 25A and the second drive plate 25B, the second springs 29 are compressed after the first springs 28 are compressed. Here will be explained a structure of the drive plate 25 in more detail. Turning to FIG. 2, there is shown one example of a structure of the first drive plate 25A. As illustrated in FIG. 2, a plurality of first apertures 30 are formed in the first drive plate 25A at regular intervals in the circumferential direction. Specifically, six first apertures 30 are formed in total in the first drive plate 25A, and the first spring 28 is held in each of the first apertures 30. A plurality of second apertures 31 are also formed in the first drive plate 25A radially outer side of the first apertures 30 at regular intervals in the circumferential direction. Specifically, three second apertures 31 are formed in total in the first drive plate 25A, and the second spring 29 is held in each of the second apertures 31. As can be seen from FIG. 2, a circumferential length of each the second apertures 31 is individually longer than a circumferential length of each the first apertures 30. The first apertures 30 and the second apertures 31 are also formed in the second drive plate 25B in the same manner, that is, the first drive plate 25A and the second drive plate 25B are formed symmetrical with each other. In other words, the second drive plate 25B has a same configuration as the first drive plate 25A, and the first drive plate 25A and the second drive plate 25B are joined to each other through the connection means 35 in such a manner that e.g., top surfaces of the first drive plate 25A and the second drive plate 25B are opposed to each other.

FIG. 3 is a partial front view showing a structure of the torsional vibration damper 1 according to the first example in more detail. The driven plate 26 is a disc member that is diametrically smaller than the first drive plate 25A and the second drive plate 25B. In the driven plate 26, same number of third apertures 32 as the first apertures 30 of the first drive plate 25A and the second drive plate 25B are formed at the radially same level as the first apertures 30, and at the same intervals in the circumferential direction as the first apertures 30. A dimension of each of the third apertures 32 is individually similar to a dimension of each of the first apertures 30 of the first drive plate 25A and the second drive plate 25B. The third apertures 32 of the driven plate 26 are individually overlapped with the first apertures 30 of the first drive plate 25A and the first apertures 30 of the second drive plate 25B to form spring holders, and the first spring 28 are held in each of the spring holders thus formed. Specifically, each of the pinion gears 22 is attached to the first drive plate 25A and the second drive plate 25B of the drive plate 25 at the radially outer side of each of the spring holder formed by the third aperture 32 and the pair of the first apertures 30. In the following explanations, the spring holder thus formed by overlapping the third aperture 32 of the driven plate 26 with the pair of first apertures 30 of the first drive plate 25A and the second drive plate 25B will be simply called the "spring holder". When the drive plate 25 and the driven plate 26 are not rotated relatively to each other and hence the first springs 28 are not compressed in the spring holder, each of the pinion gears 22 is individually situated at an initial position IP located at the radially outer side of an intermediate portion of the spring holder in the circumferential direction. When the torque of the engine 3 is applied to the torsional vibration damper 1, each of the pinion gears 22 is individually moved from the initial position IP in one of the circumferential directions according to a magnitude of the torque of the engine 3.

In the driven plate 26, a plurality of fourth apertures 33 are formed radially outer side of the third apertures 32. A circumferential length of each of the fourth apertures 33 is slightly shorter than a length of the second spring 29, and the second spring 29 is held in each of the fourth apertures 33. When the drive plate 25 and the driven plate 26 are rotated relatively to each other while compressing the first springs 28 to a certain extent, one of circumferential ends of the second apertures 31 of the first drive plate 25A and the second drive plate 25B come into contact to the second spring 29 held in the fourth aperture 33 thereby compressing the second spring 29.

A plurality of protrusions 34 are formed on the outer circumference of the driven plate 26 to protrude radially outwardly at regular intervals in the circumferential direction. When an angle of relative rotation between the drive plate 25 and the driven plate 26 is increased greater than a predetermined angle, each of the protrusions 34 is individually brought into contact to the connection means 35 connecting the first drive plate 25A and the second drive plate 25B thereby restricting the relative rotation between the drive plate 25 and the driven plate 26. Thus, the protrusions 34 and the connection means 35 serve as stoppers. An inner circumferential portion of the driven plate 26 is fixed to the above-mentioned turbine hub 12 by rivets.

External teeth is formed on the outer circumference of the driven plate 26 between the protrusions 34 so that the driven plate 26 serves as the above-mentioned sun gear 20. However, when the drive plate 25 serving as the carrier 23 is rotated by the torque of the engine 3 and the connection means 35 is brought into contact to the adjoining protrusion 34 of the driven plate 26 located in the direction of movement, the pinion gear 22 following the connection means 35 stops near the protrusion 34. Therefore, it is not necessary to form the external teeth on the outer circumference of the driven plate 26 in the vicinity of the protrusions 34. In the following explanation, the direction in which the carrier 23 is rotated by the output torque of the engine 3 will be called the "drive direction", and the opposite direction will be called the "counter direction". As illustrated in FIG. 3, a distance between the initial position IP of the pinion gear 22 and the protrusion 34 located in the drive direction is different from a distance between the initial position IP of the pinion gear 22 and the protrusion 34 located in the counter direction.

In the example shown in FIG. 3, specifically, the distance between the initial position IP of the pinion gear 22 and the protrusion 34 located in the drive direction is longer than the distance between the initial position IP of the pinion gear 22 and the protrusion 34 located in the counter direction. In other words, a first movable range A of each of the pinion gears 22 in the drive direction is wider than a second movable range B in the counter direction.

When the lockup clutch 15 is engaged, the output torque of the engine 3 is applied to the carrier 23. In this situation, the sun gear 20 is subjected to the torque rotating the input shaft 4a. Consequently, the first springs 28 are compressed by a load derived from the torque of the engine 3 and the torque rotating the input shaft 4a, and the carrier 23 and the sun gear 20 are rotated relatively to each other at a predetermined angle. That is, the drive plate 25 and the driven plate 26 are rotated relatively to each other by the predetermined angle. As a result, each of the pinion gears 22 is moved from the initial position IP toward the first movable range A in accordance with a magnitude of the torque of the engine 3. Thus, such relative rotation between the carrier 23 and the sun gear 20 is caused by the torsional torque generated by the engine 3. That is, when the engine 3 is rotated at a low speed and hence the torque of the engine 3 is small, an angle of the relative rotation of the carrier 23 with respect to the sun gear 20 is small.

In this situation, a compression force acting on the first springs 28 is changed repeatedly by a pulsation of the torque of the engine 3, and the carrier 23 and the sun gear 20 are oscillated relatively to each other. Consequently, the first springs 28 are compressed and expanded repeatedly, and each of the pinion gears 22 is oscillated within the first movable range A. A rotational speed of the ring gear 21 rotated by the torque of the engine 3 is increased in accordance with a gear ratio of the planetary gear unit 19, and the ring gear 21 is also oscillated by such compression and expansion of the first springs 28. In this situation, therefore, an angular velocity of the ring gear 21 is increased so that an inertia torque established by the ring gear 21 and the inertia body 27 is increased. Since the ring gear 21 is oscillated by the compression and expansion of the first springs 28, the oscillation of the ring gear 21 is out of phase with the pulsation of the torque of the engine 3 applied to the carrier 23. Therefore, the pulsation of the torque of the engine 3 is damped by the inertia torque established by the ring gear 21 so that the torque of the engine 3 is delivered to the transmission 4 while being smoothened.

The torque of the engine 3 as the torsional torque is increased with an increase in the rotational speed of the engine 3. When the torque of the engine 3 is increased, the relative rotation of the carrier 23 with respect to the sun gear 20 is increased, and the first springs 28 are compressed significantly. Consequently, each of the pinion gears 22 is further moved away from the initial position IP in the drive direction. However, the pulsation of the torque of the engine 3 is reduced with an increase in the rotational speed of the engine 3. In this situation, therefore, an oscillation width of each of the pinion gears 22 within the first movable range A is reduced.

When the rotational speed of the engine 3 is further increased, the torque of the engine 3 is further increased and the relative rotation of the carrier 23 with respect to the sun gear 20 is further increased. Consequently, each of the pinion gears 22 is further moved away from the initial position IP in the drive direction, and each of the first springs 28 is almost compressed completely. As a result, the second springs 29 are compressed by the torque of the engine 3 thus increased. In this situation, the second springs 29 are also compressed and expanded repeatedly by the pulsation of the torque of the engine 3. Therefore, the carrier 23 is allowed to oscillate even if the carrier 23 is further rotated relatively with respect to the sun gear 20 by the torque of the engine 3 thus increased. For this reason, the ring gear 21 is still allowed to oscillate even in this situation, so as to establish the inertia torque to damp the pulsation of the torque of the engine 3.

Figure 4:
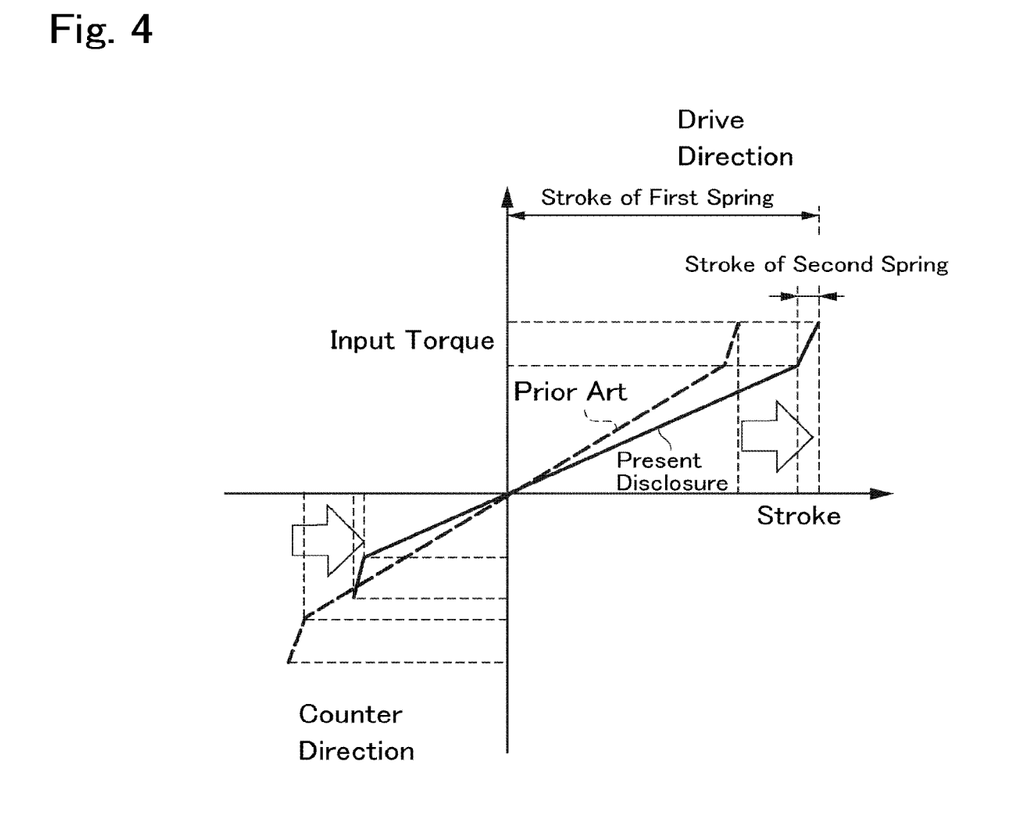
FIG. 4 is a graph indicating a stroke of springs with respect to a magnitude of a torque applied to the torsional vibration damper.

FIG. 4 is a graph indicating an amount of relative rotation of the carrier 23 with respect to the sun gear 20 in accordance with the torque applied to the carrier 23. In FIG. 4, the solid line indicates the amount of relative rotation of the carrier 23 according to the examples of the present disclosure, and the dashed line indicates an amount of relative rotation of the carrier according to the conventional art in which the movable range of the pinion gear is identical on both sides of the pinion gear. As explained above, according to the first example, the first movable range A in the drive direction is set wider than the second movable range B in the counter direction. According to the examples of the present disclosure, therefore, a stroke of the first spring 28 can be increased compared to the conventional art so that the carrier 23 is allowed to further rotate in the drive direction with respect to the sun gear 20. By thus increasing the movable range of the carrier 23 in the drive direction, a spring constant of the first spring 28 can be reduced to be further compressed compared to the conventional art. Consequently, a resonance point of the torsional vibration damper 1 can be shifted to the low speed side. According to the first example, therefore, torsional vibrations resulting from pulsation of the input torque to the torsional vibration damper 1 can be damped effectively in a low speed range of the engine 3 without increasing a size of the torsional vibration damper 1. As explained above, in the damper device taught by WO 2016/208765 A1, the intermediate member is disposed between the drive member and the driven member to enhance the vibration damping performance in the low speed range. On the other hand, according to the embodiment of the present disclosure, the vibration damping performance of the torsional vibration damper 1 in the low speed range may be enhanced without arranging such additional member. In addition, the first movable range A in the drive direction may be expanded wider than the second movable range B by processing only the driven plate 26. According to the embodiment of the present disclosure, therefore, the vibration damping performance of the torsional vibration damper 1 in the low speed range may be enhanced without increasing a manufacturing cost and a man-hour significantly.

Second Example

Figure 5:
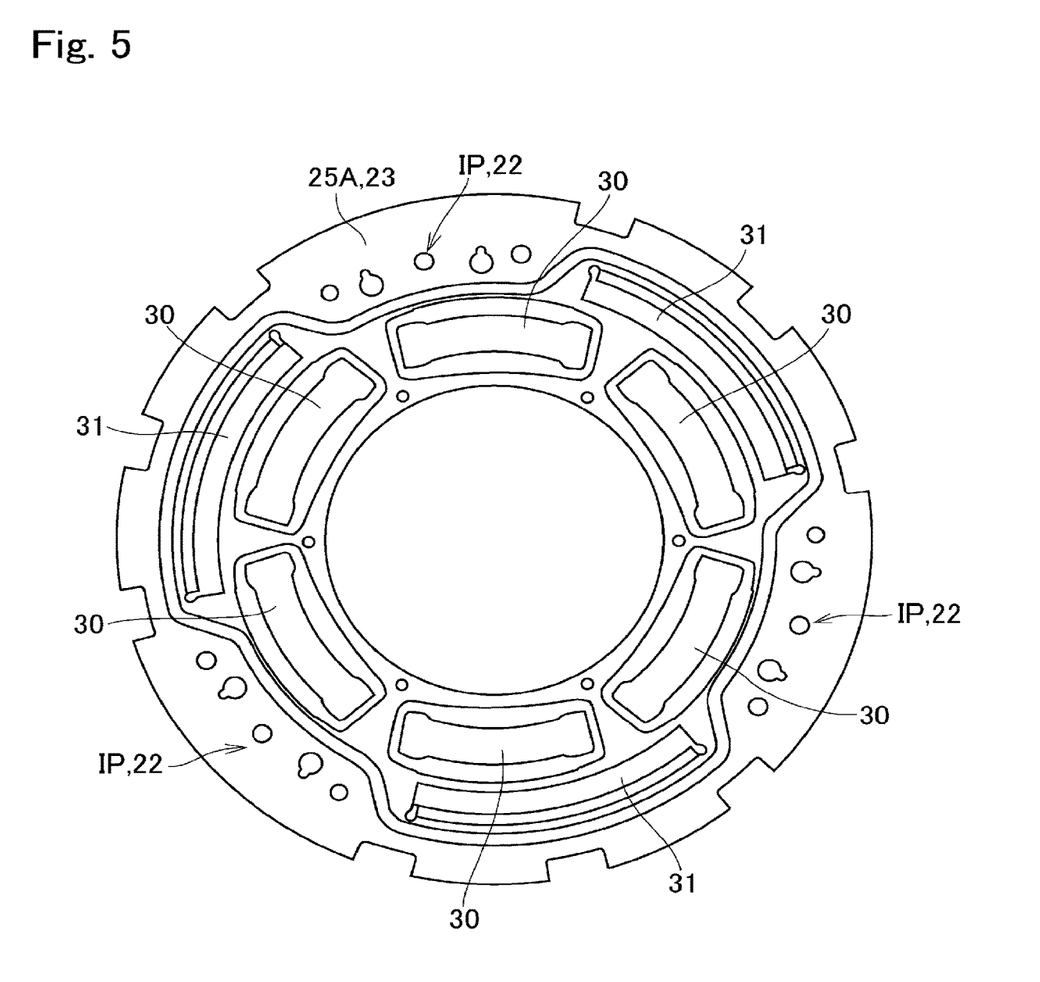
FIG. 5 is a front view showing a structure of the drive plate according to a second example of the present disclosure.
Figure 6:
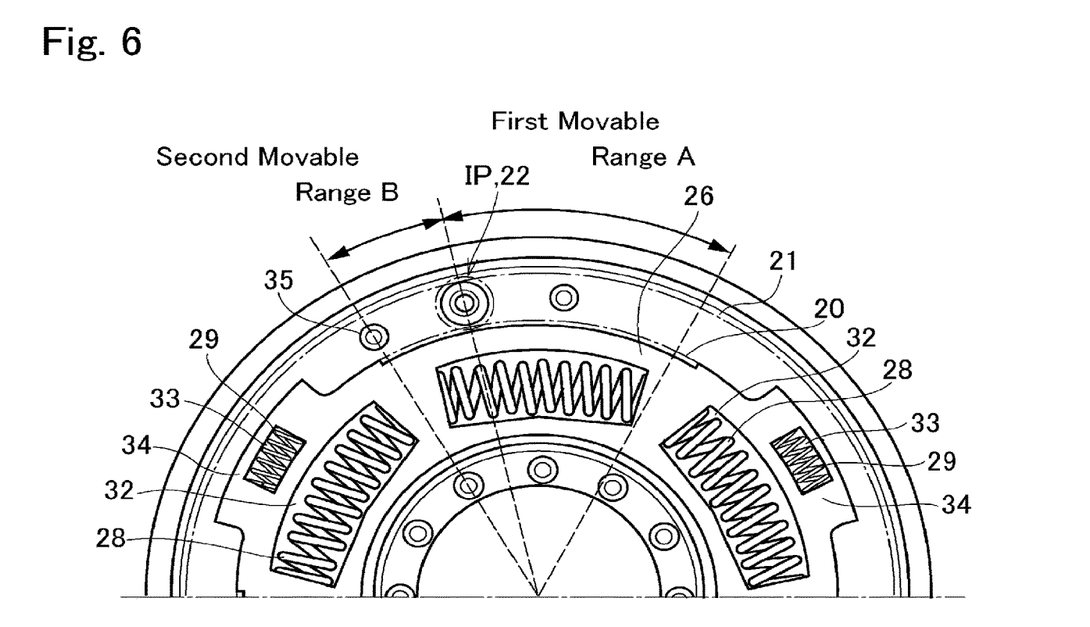
FIG. 6 is a partial front view showing a structure of the torsional vibration damper according to the second example of the present disclosure.

Turning to FIG. 5, there is shown a second example of the first drive plate 25A. As illustrated in FIG. 5, in the first drive plate 25A according to the second example, each of the first apertures 30 is individually displaced in the drive direction by a predetermined degree so that the initial position IP of each of the pinion gears 22 is situated radially outer side of an end section of the first aperture 30 in the counter direction. The second drive plate 25B has a same configuration as the first drive plate 25A, and the first drive plate 25A and the second drive plate 25B are joined to each other through the connection means 35 in such a manner that e.g., top surfaces of the first drive plate 25A and the second drive plate 25B are opposed to each other. The remaining structure of the drive plate 25 according to the second example is identical to that of the drive plate 25A according to the first example.

FIG. 5 is a partial front view showing a structure of the torsional vibration damper 1 according to the second example. According to the second example, in the driven plate 26, the protrusions 34 and the third apertures 32 are located symmetrically with respect to the center point of the torsional vibration damper 1. That is, in the driven plate 26 according to the second example, each of the third apertures 32 is individually displaced in the drive direction to be situated at an intermediate portion between the protrusions 34 so that the spring holder is formed by the first apertures 30 of the first drive plate 25A and the first apertures 30 of the second drive plate 25B and the third apertures 32 of the driven plate 26. In the driven plate 26 according to the second example, therefore, each of the fourth apertures 33 is individually situated radially outer side of an intermediate portion of the third aperture 32 in the circumferential direction. The remaining structure of the driven plate 26 according to the second example is identical to that of the driven plate 26 according to the first example.

Thus, according to the second example, the first movable range A in the drive direction may also be set wider than the second movable range B in the counter direction. According to the second example, therefore, a range of the relative rotation of the carrier 23 with respect to the sun gear 20 can be increased to achieve the same advantages as the first example. In addition, according to the second example, the protrusions 34 and the third apertures 32 are located symmetrically with respect to the center point of the driven plate 26. According to the second example, therefore, the driven plate 26 will not be subjected to a centrifugal force unevenly when the engine 3 is operated at a high speed and hence the first springs 28 and the second springs 29 are subjected to a large centrifugal force. For this reason, damage on the driven plate 26 can be limited.

Although the above exemplary embodiments of the present disclosure have been described, it will be understood by those skilled in the art that the present disclosure should not be limited to the described exemplary embodiments, and various changes and modifications can be made within the scope of the present disclosure. For example, connections of the rotary elements of the planetary gear unit 19 may be altered unless the carrier 23 is rotated by the engine torque in the drive direction.

What is claimed is:

1. A torsional vibration damper, comprising:
a planetary unit including
a first rotary element,
a second rotary element arranged concentrically around the first rotary element,
a plurality of planetary elements interposed between the first rotary element and the second rotary element while engaging with at least one of the first rotary element and the second rotary element, and
a third rotary element supporting the planetary elements in a rotatable manner;
wherein one of the rotary elements serves as an input element of the planetary unit to which a torque of an engine is applied,
another one of the rotary elements serves as an output element of the planetary unit that outputs the torque, and
still another one of the rotary elements serves as an inertia element of the planetary unit that rotates relatively to the input element and the output element,
the torsional vibration damper further comprising:
an elastic member that is interposed between the input element and the output element to be deformed elastically by a torsional torque of the engine causing a relative rotation between the input element and the output element; and
a spring holder that is formed by an aperture of the input element and an aperture of the output element to hold the elastic member therein,
wherein the inertia element is rotated by the torque of the engine and oscillated by a pulsation of the torque of the engine,
each of the planetary elements are individually situated at an initial position when the relative rotation between the input element and the output element is not caused and the elastic member is not compressed, and
an oscillation range of each planetary element is defined into a first moveable range extending from the initial position in a drive direction in which each planetary element is moved by the torsional torque of the engine, and a second movable range extending from the initial position in a counter direction opposite to the drive direction, and
the first movable range is wider than the second movable range.

2. The torsional vibration damper as claimed in claim 1, wherein the first rotary element includes a sun gear,
the second rotary element includes a ring gear,
each planetary element includes a pinion gear, the third rotary element includes a carrier,
one of the sun gear and the carrier serves as the input element,
other one of the sun gear and the carrier serves as the output element,
the ring gear serves as the inertia element,
external teeth are formed on an outer circumference of the sun gear in such a manner that the first movable range extends longer than the second movable range, and
the initial position is situated radially outer side of an intermediate portion of the spring holder in a circumferential direction.

3. The torsional vibration damper as claimed in claim 1, wherein the first rotary element includes a sun gear,
the second rotary element includes a ring gear,
each planetary element includes a pinion gear,
the third rotary element includes a carrier,
one of the sun gear and the carrier serves as the input element,
other one of the sun gear and the carrier serves as the output element,
the ring gear serves as the inertia element, and
the pinion gear is attached to the carrier in such a manner that the first movable range extends longer than the second movable range.

* * * * *